(12) United States Patent
Tang et al.

(10) Patent No.: US 11,979,808 B2
(45) Date of Patent: May 7, 2024

(54) WIRELESS COMMUNICATION METHOD AND TERMINAL DEVICE

(71) Applicant: Guangdong OPPO Mobile Telecommunications Corp., Ltd., Guangdong (CN)

(72) Inventors: Hai Tang, Dongguan (CN); Huei-Ming Lin, Melbourne (AU)

(73) Assignee: Guangdong OPPO Mobile Telecommunications Corp., Ltd., Dongguan (CN)

( * ) Notice: Subject to any disclaimer, the term of this patent is extended or adjusted under 35 U.S.C. 154(b) by 55 days.

(21) Appl. No.: 16/908,431

(22) Filed: Jun. 22, 2020

(65) Prior Publication Data

US 2020/0322768 A1    Oct. 8, 2020

Related U.S. Application Data

(63) Continuation of application No. PCT/CN2017/119560, filed on Dec. 28, 2017.

(51) Int. Cl.
*H04W 4/00* (2018.01)
*H04W 4/40* (2018.01)
(Continued)

(52) U.S. Cl.
CPC .............. *H04W 4/70* (2018.02); *H04W 4/40* (2018.02); *H04W 76/14* (2018.02); *H04W 80/04* (2013.01); *H04W 92/18* (2013.01)

(58) Field of Classification Search
None
See application file for complete search history.

(56) References Cited

U.S. PATENT DOCUMENTS 9,930,709 B2 *   3/2018   Tu ..................... H04W 74/04
10,484,926 B2 * 11/2019  Panteleev ............ H04W 28/04
(Continued)

FOREIGN PATENT DOCUMENTS

| CN | 106332176 A | 1/2017 |
| CN | 106465369 A | 2/2017 |

(Continued)

OTHER PUBLICATIONS

Decision of Rejection for Chinese Application No. 202010320580.8 dated Dec. 21, 2021. 12 pages with English translation.

(Continued)

*Primary Examiner* — Bob A Phunkulh
(74) *Attorney, Agent, or Firm* — PERKINS COIE LLP

(57) ABSTRACT

A radio communication method and a terminal device are provided. In a D2D communications system, the terminal device may determine an RAT for transmitting data, so as to ensure reliable transmission of the data. The method is applied to device-to-device communication through a PC5 carrier comprising obtaining configuration information indicates a correspondence between identifier of services and at least one Radio Access Technology (RAT) that comprises a plurality of access layer parameters, determining, at least one access layer parameter for transmitting a first service according to the configuration information, wherein the first service belongs to the at least one service, and transmitting the first service by using the at least one access layer parameter.

17 Claims, 8 Drawing Sheets

300

Start

310

A network device sends configuration information to a terminal device, so that the terminal device determines, according to the configuration information, an RAT for transmitting a first service, where the configuration information indicates a correspondence between at least one service and at least one RAT, and the first service belongs to the at least one service

End

(51) Int. Cl.
*H04W 4/70* (2018.01)
*H04W 76/14* (2018.01)
*H04W 80/04* (2009.01)
*H04W 92/18* (2009.01)

(56) References Cited

U.S. PATENT DOCUMENTS

| | | | | |
|---|---|---|---|---|
| 11,245,444 | B2* | 2/2022 | Faxér | H04L 5/0057 |
| 2014/0328329 | A1* | 11/2014 | Novlan | H04W 56/0015 |
| | | | | 370/336 |
| 2015/0005023 | A1 | 1/2015 | Wang et al. | |
| 2016/0057761 | A1* | 2/2016 | Panaitopol | H04W 76/14 |
| | | | | 370/329 |
| 2017/0127463 | A1* | 5/2017 | Narasimha | H04L 47/32 |
| 2017/0353819 | A1* | 12/2017 | Yin | H04W 4/70 |
| 2018/0124648 | A1* | 5/2018 | Park | B25B 23/103 |
| 2018/0132208 | A1* | 5/2018 | Pan | H04W 72/0406 |
| 2018/0139734 | A1* | 5/2018 | Babaei | H04W 72/0406 |
| 2018/0160342 | A1* | 6/2018 | Park | H04W 36/0007 |
| 2018/0255444 | A1* | 9/2018 | Chae | H04W 4/44 |
| 2019/0090173 | A1 | 3/2019 | Xiao et al. | |
| 2019/0150082 | A1* | 5/2019 | Kedalagudde | H04W 4/46 |
| | | | | 370/329 |
| 2019/0166059 | A1* | 5/2019 | Lee | H04L 43/16 |
| 2019/0174344 | A1* | 6/2019 | Karella | H04W 28/08 |
| 2019/0215817 | A1* | 7/2019 | Chae | H04W 56/0015 |
| 2019/0229853 | A1* | 7/2019 | Lee | H04W 28/0236 |
| 2019/0268732 | A1* | 8/2019 | Lu | H04W 4/12 |
| 2019/0349836 | A1* | 11/2019 | Lee | H04W 4/40 |
| 2020/0059944 | A1* | 2/2020 | Lee | H04W 72/14 |
| 2020/0367030 | A1* | 11/2020 | Baek | H04W 4/23 |

FOREIGN PATENT DOCUMENTS

| | | |
|---|---|---|
| CN | 106488584 A | 3/2017 |
| CN | 107040972 A | 8/2017 |
| CN | 107295460 A | 10/2017 |
| CN | 107517489 A | 12/2017 |
| JP | 2010050853 A | 3/2010 |
| JP | 2017175296 A | 9/2017 |
| WO | 2016047507 A1 | 3/2016 |
| WO | 2017192089 A2 | 11/2017 |
| WO | 2017197649 A1 | 11/2017 |

OTHER PUBLICATIONS

Examination Report for European Application No. 17936423.7 dated Nov. 11, 2021. 9 pages.
Second Office Action for Chinese Application No. 202010320580.8 dated Oct. 9, 2021. 12 pages with English translation.
First Office Action cited in Australian application 2017445062 dated Dec. 10, 2020.
CNIPA, First Office Action for Chinese Application No. 202010320580.8, dated Jul. 14, 2021. 12 pages with English translation.
IP India, Examination Report for Indian Application No. 202017030662, dated Aug. 31, 2021. 7 pages with English translation.
KIPO, Notification of Reason for Refusal for Korean Application No. 10-2020-7019437, dated Oct. 5, 2021. 12 pages with English translation.
European Patent Application No. 17936423.7, Extended European Search Report, dated Oct. 2, 2020, 16 pages.
Huawei et al., 3GPP TSG RAN Meeting #75, RP-170798, "New WID on 3GPP V2X Phase 2", Dubrovnik, Croatia, Mar. 6-9, 2017, 5 pages.
3GPP TR 22.886 V1.1.0 3rd Generation Partnership Project issued Nov. 2016, 57 pages.
Huawei et al., 3GPP TSG-RAN WG2 Meeting #93bis, R2-162289, "Configuration of PC5 and/or Un for V2V transport", Dubrovink, Croatia, issued Apr. 2016, 5 pages.
Intel Corporation, 3GPP TSG RAN1 WG Meeting #88bis R1-1705446, "On Carrier Aggregation for LTE V2V Sidelink Communication", Spokane, USA, issued on Apr. 3-7, 2017. 9 pages.
Ericsson, 3GPP TSG-RAN WG2 #100 R2-1713509. "Clarification to Mapping Between Service Type and V2X Frequencies", Reno, NV, USA, Nov. 27-Dec. 1, 2017, 6 pages.
International Application No. PCT/CN2017/119560, International search report, dated Sep. 25, 2018, 2 pages.
EPO, Office Action for European Patent Application No. 17936423.7, dated Jun. 7, 2021. 11 pages.
Intel Corporation, "Resource pool sharing between mode 3 and 4" R2-1712630; 3GPP TSG RAN WG2 Meeting #100; Dec. 2017. 4 pages.
JPO, Notice of Reasons for Refusal for Japanese Patent Application No. 2020-535219, dated Jun. 25, 2021. 6 pages with English translation.
KIPO, Notification of Reason for Refusal for Korean Patent Application No. 10-2020-7019437, dated Apr. 14, 2021. 12 pages with English translation.
3GPP "Study on enhancement of 3GPP Support for 5G V2X Services (Release 15)" 3GPP TR 22.886 V2.0.0 (Dec. 2016); 3 pages.
Notice of Final Rejection for Korean Application No. 10-2020-7019437 dated Apr. 14, 2022. 8 pages with English translation.
Notice of Reasons for Refusal for Japanese Application No. 2020-535219 dated Jan. 28, 2022. 10 pages with English translation.
LG Electronics, Inc. "RAN 2 aspects regarding support of 64QAM and TX diversity" R2-1711686; 3GPP TSG-RAN2 #99bis; Prague, Czech, Oct. 9-13, 2017. 3 pages.
Second Final Rejection of the Korean application No. 10-2020-7019437, dated Jun. 2, 2022. 12 pages with English Translation.
Third Examination Report of the European application No. 17936423.7, dated Apr. 29, 2022. 10 pages.
ZTE "Discussion on support of 64QAM over sidelink" R2-1713080; 3GPP TSG-RAN WG2 Meeting #100; Reno, USA, Nov. 27-Dec. 1, 2017. 3 pages.
Decision of Dismissal of Amendment for Japanese Application No. 2020-535219 dated Aug. 19, 2022. 6 pages with English translation.
Decision of Refusal for Japanese Application No. 2020-535219 dated Aug. 19, 2022. 2 pages with English translation.
Examination Report for European Application No. 17936423.7 dated Oct. 14, 2022. 10 pages.
Notice of Re-Examination for Chinese Application No. 202010320580.8 dated Sep. 29, 2022. 15 pages with English translation.
Third Office Action for Chinese Application No. 202010320580.8 dated Oct. 17, 2022. 7 pages with English translation.
Decision on Appeal for Korean Application No. 10-2020-7019437 dated Apr. 3, 2023. 24 pages with English translation.
Examination Report for European Application No. 17936423.7 dated Mar. 29, 2023. 10 pages.
Notice of Termination of Reconsideration by Examiner's before Appeal Proceedings for Japanese Application No. 2020-535219 dated Feb. 28, 2023. 2 pages with English translation.
Reconsideration Report by Examiner before Appeal for Japanese Application No. 2020-535219 dated Feb. 17, 2023. 8 pages with English translation.
Notice of Reasons for Refusal of the JP application No. 2020-535219, issued on Jun. 15, 2023. 6 pages with English translation.
Sixth Examination Report of European application No. 17936423.7 issued on Sep. 18, 2023, 11 pages.

* cited by examiner

WIRELESS COMMUNICATION METHOD AND TERMINAL DEVICE

CROSS-REFERENCE TO RELATED APPLICATION

This application is a continuation of and claims priority to International Patent Application PCT/CN2017/119560, filed Dec. 28, 2017, the contents of which is hereby incorporated by reference in its entirety.

BACKGROUND OF THE INVENTION

Technical Field

This application relates to the communications field, and more specifically, to a radio communication method, a terminal device, and a network device.

Related Art

In a device-to-device (D2D) communications system, a terminal device (for example, a vehicle-mounted terminal) may perform data transmission with a network device on an uplink through a Uu carrier and perform data transmission with other terminals on a sidelink through a PC5 carrier.

To ensure data transmission, the terminal device further needs to determine a Radio Access Technology (RAT) for transmitting data. However, there is no determinate solution yet to resolve the problem of how the terminal device determines the RAT for transmitting data.

SUMMARY OF THE INVENTION

Embodiments of this application provide a radio communication method, a terminal device, and a network device. In a D2D communications system, the terminal device may determine an RAT for transmitting data, so as to ensure reliable transmission of the data.

According to a first aspect, an embodiment of this application provides a radio communication method applied to device-to-device communication, the method including determining, by a terminal device according to configuration information, a Radio Access Technology (RAT) for transmitting a first service, where the configuration information indicates a correspondence between at least one service and at least one RAT, and the first service belongs to the at least one service.

Therefore, in the radio communication method according to this embodiment of this application, the terminal device may determine, according to the configuration information indicating the correspondence between the at least one service and the at least one RAT, the RAT for transmitting the first service, so as to ensure reliable transmission of data of the first service.

Optionally, in an implementation of the first aspect, the configuration information is specifically configured to indicate a correspondence between an identifier of the at least one service and the at least one RAT.

Optionally, in an implementation of the first aspect, the identifier of the at least one service is a Provider Service Identifier (PSID) or an Intelligent Transportation System Application Identifier (ITS-AID).

Optionally, in an implementation of the first aspect, the configuration information is specifically configured to indicate a correspondence between a Prose Per-Packet Priority (PPPP) of the at least one service and the at least one RAT.

Optionally, in an implementation of the first aspect, the RAT is an RAT for a first-type carrier, and/or, an RAT for a second-type carrier, where the first-type carrier is configured to transmit data on an uplink, and the second-type carrier is configured to transmit data on a sidelink.

Optionally, in an implementation of the first aspect, the RAT includes a plurality of access layer parameters, and the plurality of access layer parameters is at least one of the following: whether 64 quadrature amplitude modulation (64QAM) is used for modulation, whether transmit diversity is used for transmission, and whether carrier aggregation is used for transmission.

Optionally, in an implementation of the first aspect, the terminal device is an access layer of the terminal device, and before the terminal device determines, according to the configuration information, the RAT for transmitting the first service, the method further includes receiving, by the access layer of the terminal device, the configuration information from a higher layer of the terminal device.

Optionally, in an implementation of the first aspect, before the terminal device determines, according to the configuration information, the RAT for transmitting the first service, the method further includes receiving, by the terminal device, the configuration information from a network device.

According to a second aspect, an embodiment of this application provides a radio communication method applied to device-to-device communication, the method including sending, by a network device, configuration information to a terminal device, so that the terminal device determines, according to the configuration information, a Radio Access Technology (RAT) for transmitting a first service, where the configuration information indicates a correspondence between at least one service and at least one RAT, and the first service belongs to the at least one service.

Therefore, in the radio communication method according to this embodiment of this application, the network device configures, for the terminal device, the configuration information indicating the correspondence between the at least one service and the at least one RAT, so that the terminal device may determine, according to the configuration information, the RAT for transmitting the first service, so as to ensure reliable transmission of data of the first service.

Optionally, in an implementation of the second aspect, configuration information is specifically configured to indicate a correspondence between an identifier of the at least one service and the at least one RAT.

Optionally, in an implementation of the second aspect, the identifier of the at least one service is a PSID or an ITS-AID.

Optionally, in an implementation of the second aspect, the configuration information is specifically configured to indicate a correspondence between a PPPP of the at least one service and the at least one RAT.

Optionally, in an implementation of the second aspect, the RAT is an RAT for a first-type carrier, and/or, an RAT for a second-type carrier, where the first-type carrier is configured to transmit data on an uplink and/or a downlink, and the second-type carrier is configured to transmit data on a sidelink.

Optionally, in an implementation of the second aspect, the RAT includes a plurality of access layer parameters, and the plurality of access layer parameters is at least one of the following: whether 64QAM is used for modulation, whether transmit diversity is used for transmission, and whether carrier aggregation is used for transmission.

According to a third aspect, an embodiment of this application provides a terminal device, including modules or units that can perform the method according to the first aspect or any optional implementation of the first aspect.

According to a fourth aspect, an embodiment of this application provides a network device, including modules or units that can perform the method according to the second aspect or any optional implementation of the second aspect.

According to a fifth aspect, a terminal device is provided, including a processor, a memory, and a communications interface. The processor is connected to the memory and the communications interface. The memory is configured to store an instruction, the processor is configured to execute the instruction, and the communications interface is configured to communicate with another network element under the control of the processor. When the processor executes the instruction stored in the memory, the execution causes the processor to perform the method according to the first aspect or any possible implementation of the first aspect.

According to a sixth aspect, a network device is provided, including a processor, a memory, and a communications interface. The processor is connected to the memory and the communications interface. The memory is configured to store an instruction, the processor is configured to execute the instruction, and the communications interface is configured to communicate with another network element under the control of the processor. When the processor executes the instruction stored in the memory, the execution causes the processor to perform the method according to the second aspect or any possible implementation of the second aspect.

According to a seventh aspect, a computer storage medium is provided, where the computer storage medium stores program code, and the program code is configured to instruct a computer to execute instructions of the method according to the foregoing aspects.

According to an eighth aspect, a computer program product including an instruction is provided, and the computer program product, when run on a computer, causes the computer to perform the method according to the foregoing aspects.

DETAILED DESCRIPTION OF THE INVENTION

The technical solutions in embodiments of this application are described clearly and completely with reference to the accompanying drawings in the embodiments of this application below.

It should be understood that, the technical solutions in the embodiments of this application may be applied to a device-to-device (D2D) communications system, for example, an Internet of Vehicles system that performs D2D communication based on Long Term Evolution (LTE). Different from a method in a conventional LTE system in which communication data is received or sent between terminals through a network device (for example, a base station), the Internet of Vehicles system uses a device-to-device direct communication method, and therefore has higher spectral efficiency and a lower transmission delay.

Optionally, a communications system on which the Internet of Vehicles system is based may be a Global System of Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, an LTE Time Division Duplex (TDD) system, a Universal Mobile Telecommunication System (UMTS), a Worldwide Interoperability for Microwave Access (WiMAX) communications system, a 5G New Radio (NR) system, and the like.

The terminal device in the embodiments of this application may be a terminal device that may implement D2D communication. For example, the terminal device may be a vehicle-mounted terminal device, or may be a terminal device in a 5G network, a terminal device in a future evolved Public Land Mobile Network (PLMN), or the like, which is not limited by the embodiments of this application.

Figure 1:
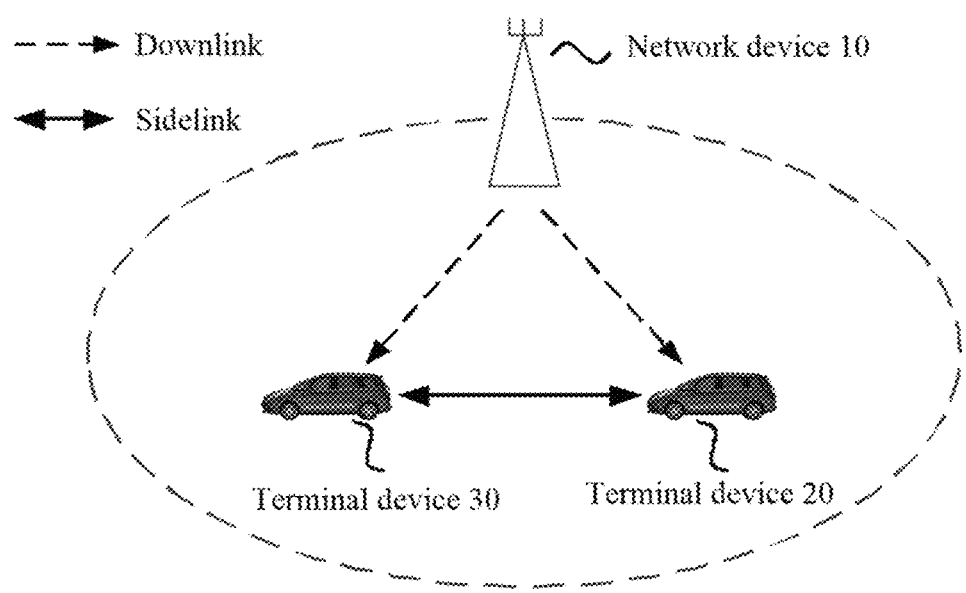
FIG. 1 is a schematic diagram of an application scenario according to an embodiment of this application.
Figure 2:
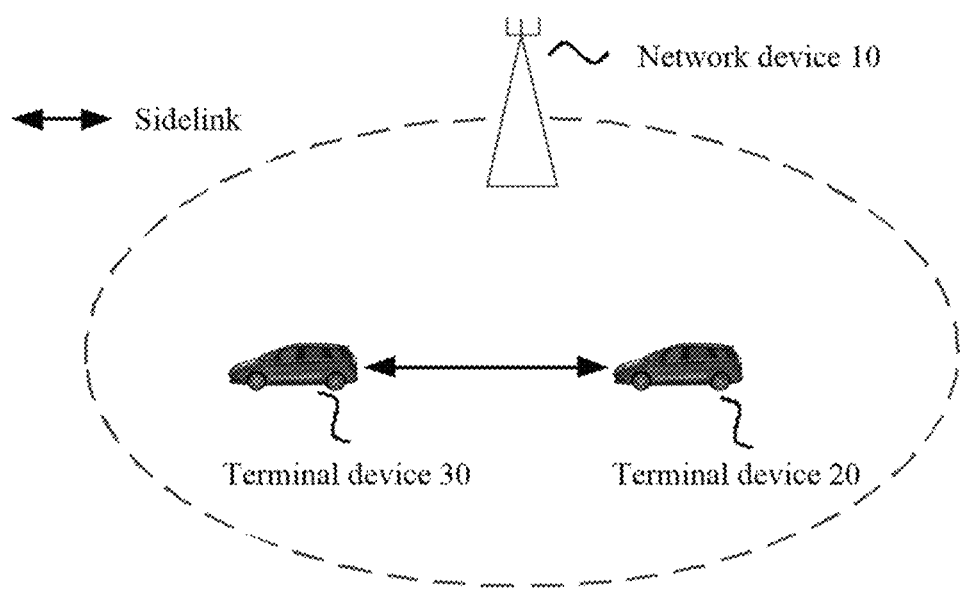
FIG. 2 is a schematic diagram of another application scenario according to an embodiment of this application.

FIG. 1 and FIG. 2 are each a schematic diagram of an application scenario according to an embodiment of this application. FIG. 1 shows an example including a network device and two terminal devices. Optionally, a radio communications system in the embodiments of this application may include a plurality of network devices, and another quantity of terminal devices may be included within the coverage of each network device, which is not limited by the embodiments of this application.

Optionally, the radio communications system may further include other network entities such as a mobile management entity (MME), a serving gateway (S-GW), and a packet data network gateway (P-GW), or the radio communications system may further include other network entities such as a session management function (SMF), unified data management (UDM), and an authentication server function (AUSF), which is not limited by the embodiments of this application.

Specifically, a terminal device 20 and a terminal device 30 may communicate through a D2D communications mode. When performing D2D communication, the terminal device 20 and the terminal device 30 directly communicate through a D2D link, that is, a sidelink (SL). As shown in FIG. 1 or FIG. 2, the terminal device 20 and the terminal device 30 directly communicate through the sidelink. In FIG. 1, the terminal device 20 and the terminal device 30 communicate through the sidelink, and a transmission resource is allocated by the network device. In FIG. 2, the terminal device 20 and the terminal device 30 communicate through the sidelink, the transmission resource is autonomously selected by the terminal device, and the network device does not need to allocate the transmission resource.

D2D communication may be vehicle-to-vehicle (V2V for short) communication or vehicle-to-everything (V2X) communication. In V2X communication, X may generally refer to any device having a radio receiving and sending capability, for example, but not limited to, a radio apparatus moving at a low speed, an in-vehicle device moving at a high speed, or a network control node having a radio transmitting and receiving capability. It should be understood that the embodiments of the present invention are mainly applied to a V2X communication scenario, and may be also applied to any other D2D communication scenario, which is not limited by the embodiments of this application.

In an internet of vehicles system, there may be two types of terminal devices: a terminal device with a sensing capability, such as vehicle user equipment (VUE) or pedestrian user equipment (PUE), and a terminal device without a sensing capability, such as a PUE. The VUE has a higher processing capability and is generally powered by a battery in the vehicle, while a processing capability of the PUE is lower; power consumption reduction is also a main factor that needs to be considered for the PUE. Therefore, in an existing internet of vehicles system, the VUE is considered as having full receiving and listening capabilities, while the PUE is considered as having partial or no receiving and listening capabilities. If the PUE has a partial listening capability, the PUE may select a resource by using a listening method similar to that of the VUE, that is, an available resource is selected from partial resources that the PUE can listen on. If the PUE has no listening capability, the PUE selects a transmission resource randomly from a resource pool.

In addition, aspects or features of this application may be implemented as a method, an apparatus or a product that uses standard programming and/or engineering technologies. The term "product" used in this application covers a computer program that can be accessed from any computer-readable device, carrier or medium. For example, a computer-readable medium may include, but is not limited to: a magnetic storage device (such as a hard disk, a floppy disk, or a magnetic tape), an optical disc (such as a compact disk (CD), or a digital versatile disc (DVD)), a smartcard and a flash memory device (such as an erasable programmable read-only memory (EPROM), a card, a stick, or a key drive). In addition, various storage media described in this specification may indicate one or more devices and/or other machine-readable media that are used to store information. The term "machine-readable media" may include, but is not limited to, various media that can store, contain, and/or carry an instruction and/or data.

It should be understood that, terms "system" and "network" in this specification are usually interchangeably used in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 3:
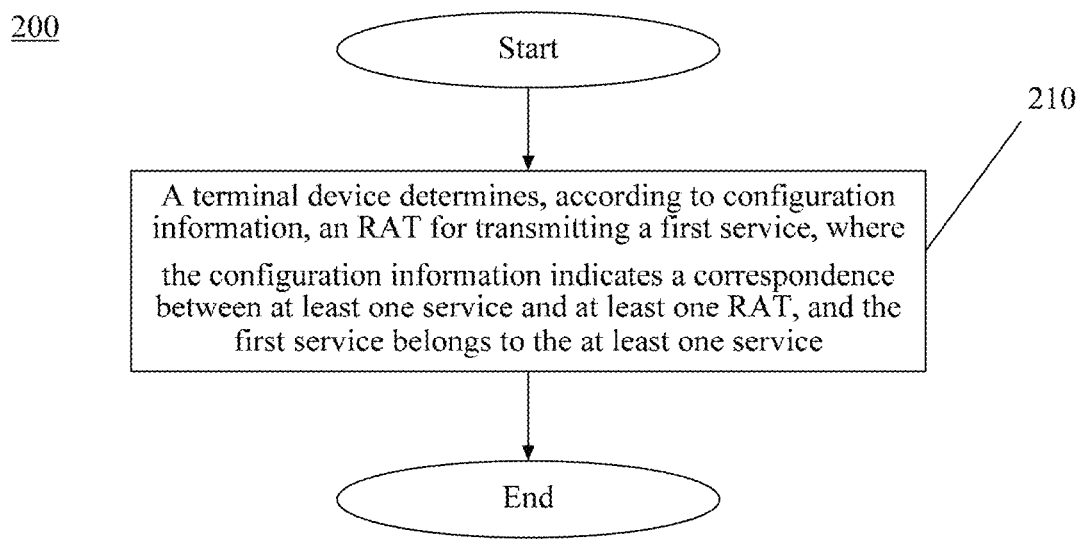
FIG. 3 is a schematic flowchart of a radio communication method according to an embodiment of this application.

FIG. 3 is a schematic flowchart of a radio communication method 200 according to an embodiment of this application. As shown in FIG. 3, the method 200 is applied to device-to-device communication. The method 200 may be performed by a terminal device. The terminal device may be the terminal device shown in FIG. 1 or FIG. 2. The method 200 includes the content:

210. The terminal device determines, according to configuration information, an RAT for transmitting a first service.

The configuration information indicates a correspondence between at least one service and at least one RAT, and the first service belongs to the at least one service.

For example, the RAT for transmitting the first service is an RAT for a 5-Generation New Radio (5G NR) communications network.

For another example, the RAT for transmitting the first service is an RAT for an LTE communications network.

Optionally, the configuration information is configured for a correspondence between the first service and the at least one RAT.

For example, the configuration information indicates that the first service corresponds to an RAT 1.

For another example, the configuration information indicates that the first service corresponds to the RAT 1 and an RAT 2.

Optionally, the configuration information is configured for the correspondence between the at least one service and the at least one RAT.

For example, as shown in FIG. 1, the first service is a service b, and corresponds to the RAT 1.

TABLE 1

| Service a | RAT 2, RAT 3 |
| Service b | RAT 1 |
| Service c | RAT 5 |
| Service d | RAT 2, RAT 4 |
| Service e | RAT 1, RAT 2, RAT 3 |
| ... | ... |

Optionally, the configuration information is specifically configured to indicate a correspondence between an identifier of the at least one service and the at least one RAT.

For example, an identifier of a service is A, and the configuration information indicates that the service A corresponds to the RAT 1.

Optionally, the identifier of the at least one service is a PSID or an ITS-AID.

Optionally, the configuration information is specifically configured to indicate a correspondence between a PPPP of the at least one service and the at least one RAT.

For example, the configuration information indicates that data of a service PSID A and a service PPPP 3 corresponds to the RAT 1, and data of the service PSID A and a service PPPP 2 corresponds to the RAT 2.

Optionally, the RAT is an RAT for a first-type carrier, and/or, an RAT for a second-type carrier, where the first-type carrier is configured to transmit data on an uplink, and the second-type carrier is configured to transmit data on a sidelink.

Optionally, the first-type carrier may be a Uu carrier, and the second-type carrier may be a PC5 carrier.

Optionally, the RAT includes a plurality of access layer parameter, and the plurality of access layer parameters is at least one of the following: whether 64QAM is used for modulation, whether transmit diversity is used for transmission, and whether carrier aggregation is used for transmission.

Optionally, an access layer of the terminal device receives the configuration information from a higher layer of the terminal device.

Optionally, the configuration information may be preconfigured in the higher layer of the terminal device, or may be dynamically configured in the higher layer of the terminal device by a network device.

Optionally, the terminal device receives the configuration information from the network device.

Therefore, in the radio communication method according to this embodiment of this application, the terminal device may determine, according to the configuration information indicating the correspondence between the at least one service and the at least one RAT, the RAT for transmitting the first service, so as to ensure reliable transmission of data of the first service.

Figure 4:
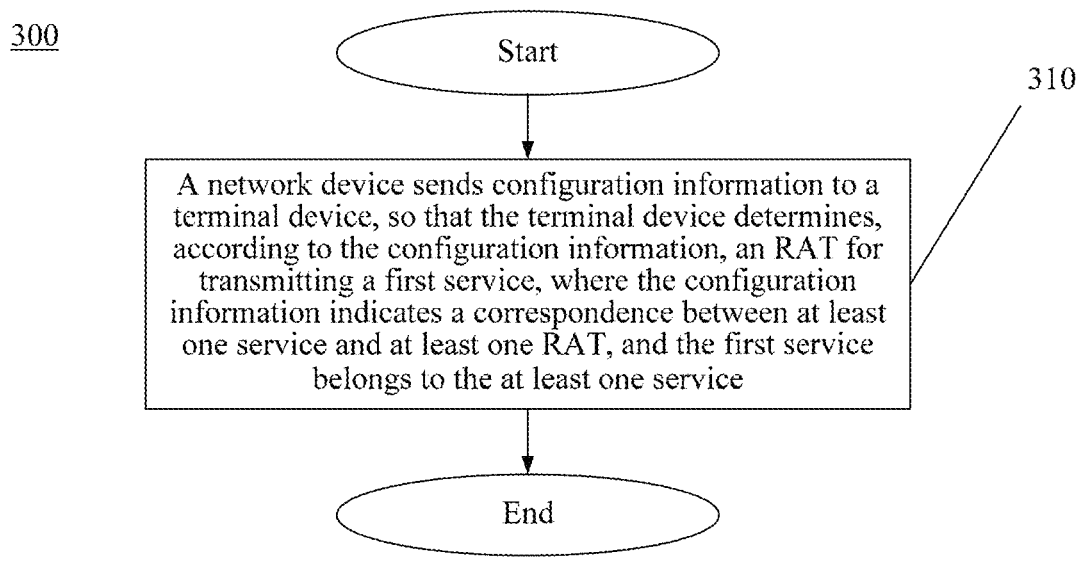
FIG. 4 is a schematic flowchart of a radio communication method according to another embodiment of this application.

FIG. 4 is a schematic flowchart of a radio communication method 300 according to an embodiment of this application. As shown in FIG. 4, the method 300 is applied to device-to-device communication. The method 300 may be performed by a network device. The network device may be the network device shown in FIG. 1. The method 300 includes the following content:

310. The network device sends configuration information to a terminal device, so that the terminal device determines, according to the configuration information, an RAT for transmitting a first service.

The configuration information indicates a correspondence between at least one service and at least one RAT, and the first service belongs to the at least one service.

Optionally, the configuration information is specifically configured to indicate a correspondence between an identifier of the at least one service and the at least one RAT.

Optionally, the identifier of the at least one service is a PSID or an ITS-AID.

Optionally, the configuration information is specifically configured to indicate a correspondence between a PPPP of the at least one service and the at least one RAT.

Optionally, the RAT is an RAT for a first-type carrier, and/or, an RAT for a second-type carrier, where the first-type carrier is configured to transmit data on an uplink and/or a downlink, and the second-type carrier is configured to transmit data on a sidelink.

Optionally, the RAT includes a plurality of access layer parameters, and the plurality of access layer parameters is at least one of the following: whether 64QAM is used for modulation, whether transmit diversity is used for transmission, and whether carrier aggregation is used for transmission.

It should be understood that, for the steps in the radio communication method 300, reference may be made to the descriptions of corresponding steps in the radio communication method 200. For brevity, details are not described herein again.

Therefore, in the radio communication method according to this embodiment of this application, the network device configures the configuration information indicating the correspondence between the at least one service and the at least one RAT for the terminal device, so that the terminal device may determine, according to the configuration information, the RAT for transmitting the first service, so as to ensure reliable transmission of data of the first service.

Figure 5:
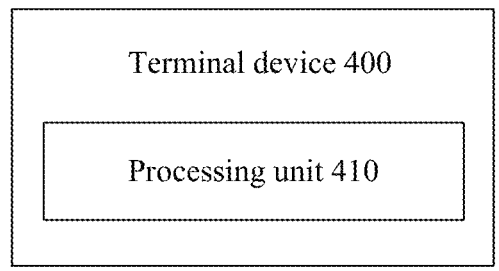
FIG. 5 is a schematic block diagram of a terminal device according to an embodiment of this application.

FIG. 5 is a schematic block diagram of a terminal device 400 according to an embodiment of this application. As shown in FIG. 5, the terminal device 400 is applied to device-to-device communication, and the terminal device 400 includes a processing unit 410, configured to determine, according to configuration information, a Radio Access Technology (RAT) for transmitting a first service.

The configuration information indicates a correspondence between at least one service and at least one RAT, and the first service belongs to the at least one service.

Optionally, the configuration information is specifically configured to indicate a correspondence between an identifier of the at least one service and the at least one RAT.

Optionally, the identifier of the at least one service is a Provider Service Identifier (PSID) or an Intelligent Transportation System Application Identifier (ITS-AID).

Optionally, the configuration information is specifically configured to indicate a correspondence between a Prose Per-Packet Priority (PPPP) of the at least one service and the at least one RAT.

Optionally, the RAT is an RAT for a first-type carrier, and/or, an RAT for a second-type carrier, where the first-type carrier is configured to transmit data on an uplink, and the second-type carrier is configured to transmit data on a sidelink.

Optionally, the RAT includes a plurality of access layer parameters, and the plurality of access layer parameters is at least one of the following whether quadrature amplitude modulation 64QAM is used for modulation, whether transmit diversity is used for transmission, and whether carrier aggregation is used for transmission.

Optionally, the terminal device is an access layer of the terminal device, and before the processing unit 410 determines, according to the configuration information, the RAT for transmitting the first service, the terminal device 400 further includes a receiving unit 420, configured to receive the configuration information from a higher layer of the terminal device.

Optionally, before the processing unit 410 determines, according to the configuration information, the RAT for transmitting the first service, the terminal device 400 further include a receiving unit 420, configured to receive the configuration information from a network device.

It should be understood that, the terminal device 400 may correspond to the terminal device in the method embodiment, and may implement corresponding operations implemented by the terminal device in the method embodiment. For brevity, details are not described herein again.

Figure 6:
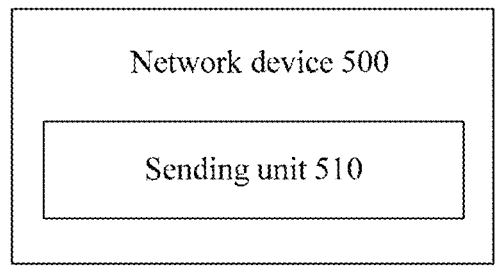
FIG. 6 is a schematic block diagram of a network device according to an embodiment of this application.

FIG. 6 is a schematic block diagram of a network device 500 according to an embodiment of this application. As shown in FIG. 6, the network device 500 is applied to device-to-device communication, and the network device 500 include a sending unit 510, configured to send configuration information to a terminal device, so that the terminal device determines, according to the configuration information, a Radio Access Technology (RAT) for transmitting a first service.

The configuration information indicates a correspondence between at least one service and at least one RAT, and the first service belongs to the at least one service.

Optionally, the configuration information is specifically configured to indicate a correspondence between an identifier of the at least one service and the at least one RAT.

Optionally, the identifier of the at least one service is a Provider Service Identifier (PSID) or an Intelligent Transportation System Application Identifier (ITS-AID).

Optionally, the configuration information is specifically configured to indicate a correspondence between a Prose Per-Packet Priority (PPPP) of the at least one service and the at least one RAT.

Optionally, the RAT is an RAT for a first-type carrier, and/or, an RAT for a second-type carrier, where the first-type carrier is configured to transmit data on an uplink and/or a downlink, and the second-type carrier is configured to transmit data on a sidelink.

Optionally, the RAT includes a plurality of access layer parameters, and the plurality of access layer parameters is at least one of the following whether quadrature amplitude modulation 64QAM is used for modulation, whether transmit diversity is used for transmission, and whether carrier aggregation is used for transmission.

It should be understood that, the network device 500 may correspond to the network device in the method embodiment, and may implement corresponding operations implemented by the network device in the method embodiment. For brevity, details are not described herein again.

Figure 7:
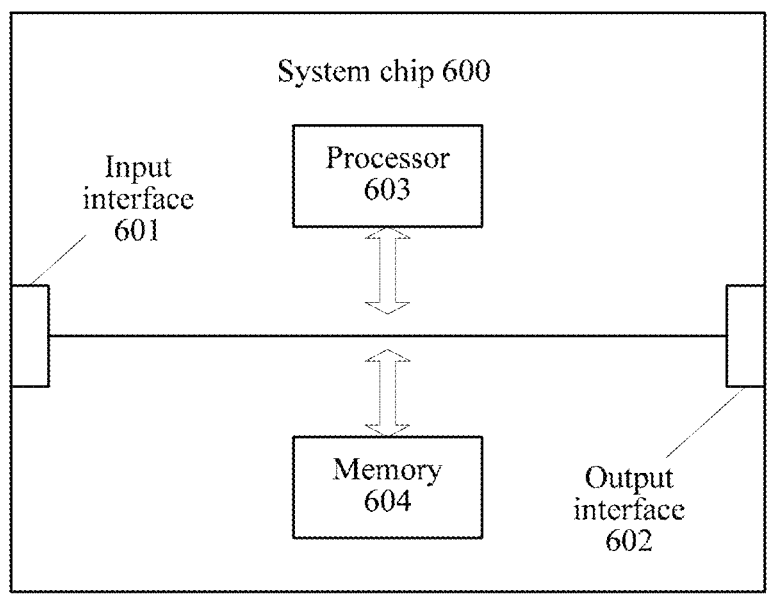
FIG. 7 is a schematic structural diagram of a system chip according to an embodiment of this application.

FIG. 7 is a schematic structural diagram of a system chip 600 according to an embodiment of this application. The system chip 600 in FIG. 7 includes an input interface 601, an output interface 602, a processor 603 and a memory 604 that may be connected to each other through an internal communications connection line, and the processor 603 is configured to execute code in the memory 604.

Optionally, when the code is executed, the processor 603 implements the method performed by the terminal device in the method embodiments. For brevity, details are not described herein again.

Optionally, when the code is executed, the processor 603 implements the method performed by the network device in the method embodiment. For brevity, details are not described herein again.

Figure 8:
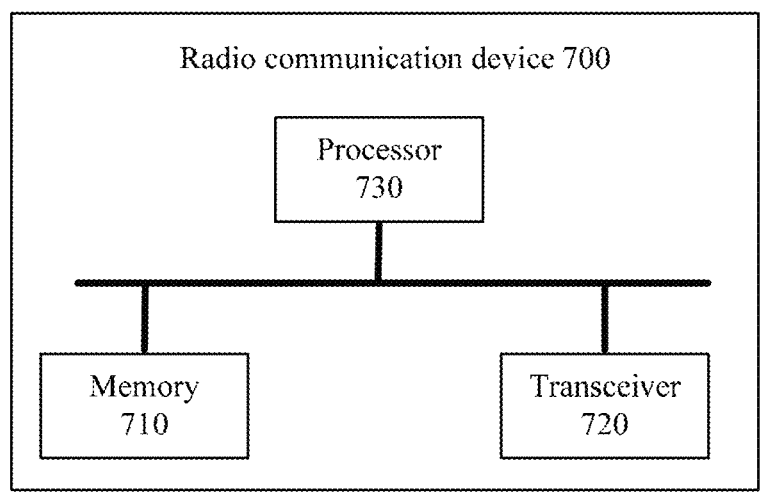
FIG. 8 is a schematic block diagram of a radio communication device according to an embodiment of this application.

FIG. 8 is a schematic block diagram of a radio communication device 700 according to an embodiment of this application. As shown in FIG. 8, the communication device 700 includes a processor 710 and a memory 720. The memory 720 may store program code, and the processor 710 may execute the program code stored in the memory 720.

Optionally, as shown in FIG. 8, the communication device 700 may include a transceiver 730, and the processor 710 may control the transceiver 730 to communicate with the outside.

Optionally, the processor 710 may invoke the program code stored in the memory 720, to perform corresponding operations of the terminal device in the method embodiment, and for brevity, details are not described herein again.

Optionally, the processor 710 may invoke the program code stored in the memory 720, to perform corresponding operations of the network device in the method embodiment, and for brevity, details are not described herein again.

It should be understood that, the processor of this embodiment of this application may be an integrated circuit chip, and has a signal processing capability. During implementation, the steps of the foregoing method embodiment may be implemented through a hardware integrated logic circuit in the processor or implemented through an instruction in a software form. The foregoing processor may be a general purpose processor, a digital signal processor (DSP), an application-specific integrated circuit (ASIC), a field programmable gate array (FPGA), or another programmable logical device, discrete gate or transistor logical device, or discrete hardware component. The processor may implement or perform methods, steps and logical block diagrams disclosed in the embodiments of this application. The general purpose processor may be a microprocessor or the processor may be any conventional processor and the like. Steps of the methods disclosed with reference to the embodiments of this application may be directly executed and completed by means of a hardware decoding processor, or may be executed and completed through a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It can be understood that, the memory in the embodiments of this application may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. Through exemplary but not limitative description, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM). It should be noted that, the memory for the system and the method described herein aims to include but not limited to these memories and any other suitable types of memories.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or some of the steps of the method described in the embodiments of this application. The foregoing storage medium includes: any medium that can store program code, such as a USB flash disk, a removable hard disk, a read-only memory (ROM), a random access memory (RAM), a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A radio communication method, applied to device-to-device communication through a PC5 carrier, the method comprising:
   obtaining, by a terminal device from a network device, configuration information indicating a correspondence between an identifier of services and at least one Radio Access Technology (RAT) that comprises a plurality of access layer parameters, the plurality of access layer parameters of the at least one RAT indicated in the configuration information from the network device comprising whether 64 quadrature amplitude modulation (64QAM) is used for modulation;
   determining, by the terminal device, a RAT corresponding to a first service based on the correspondence and the access layer parameter that whether 64 quadrature amplitude modulation (64QAM) is used for modulation, when the first service corresponds to at least two RATs; and
   transmitting, by the terminal device, the first service by using the determined RAT.

2. The method of claim 1 wherein the identifier of services comprises at least one of a Provider Service Identifier (PSID) or an Intelligent Transportation System Application Identifier (ITS-AID).

3. The method of claim 1 wherein:
   the configuration information is further configured to indicate a correspondence between a Prose Per-Packet Priority (PPPP) of the services and the at least one RAT.

4. The method of claim 1 further comprising receiving, by the terminal device, the configuration information from the network device before the terminal device determines, according to the configuration information, the RAT for transmitting the first service.

5. The method of claim 1 wherein:
   the RAT is at least one of an RAT for a first-type carrier or an RAT for a second-type carrier; and
   the first-type carrier is configured to transmit data on an uplink, and the second-type carrier is configured to transmit data on a sidelink.

6. The method of claim 1 wherein the plurality of access layer parameters of the at least one RAT further comprises whether transmit diversity is used for transmission, or whether carrier aggregation is used for transmission.

7. The method of claim 1 wherein the configuration information is profile information which indicates a correspondence between the identifier of services and the at least one RAT.

8. A terminal device, applied to device-to-device communication through a PC5 carrier, the terminal device comprising:
   at least one processor; and
   at least one memory including program code;
   the at least one memory and the program code configured to, with the at least one processor, cause the terminal device to perform:
   obtaining, by the terminal device from a network device, configuration information indicating a correspondence between an identifier of services and at least one Radio Access Technology (RAT) that comprises a plurality of access layer parameters, the plurality of access layer parameters of the at least one RAT indicated in the configuration information from the network device comprising whether 64 quadrature amplitude modulation (64QAM) is used for modulation;
   determining, by the terminal device, a RAT corresponding to a first service based on the correspondence and the access layer parameter that whether 64 quadrature amplitude modulation (64QAM) is used for modulation, when the first service corresponds to at least two RATs; and
   transmitting, by the terminal device, the first service by using the determined RAT.

9. The terminal device of claim 8 wherein the identifier of the services is a Provider Service Identifier (PSID) or an Intelligent Transportation System Application Identifier (ITS-AID).

10. The terminal device of claim 8 wherein:
    the configuration information is further configured to indicate a correspondence between a Prose Per-Packet Priority (PPPP) of the services and the at least one RAT.

11. The terminal device of claim 8 wherein the terminal device further comprises a communications interface, configured to receive the configuration information from the network device before the terminal device determines, according to the configuration information, the RAT for transmitting the first service.

12. The terminal device of claim 8 wherein:
    the RAT is at least one of an RAT for a first-type carrier or an RAT for a second-type carrier; and
    the first-type carrier is configured to transmit data on an uplink, and the second-type carrier is configured to transmit data on a sidelink.

13. The terminal device of claim 8 wherein the plurality of access layer parameters of the at least one RAT further comprises whether transmit diversity is used for transmission, or whether carrier aggregation is used for transmission.

14. The terminal device of claim 8 wherein the configuration information is profile information which indicates a correspondence between the identifier of services and the at least one RAT.

15. A non-transitory computer-readable storage medium storing computer-executable instructions that, when executed by one or more processors of a terminal device, cause the terminal device to perform operations comprising:
    obtaining, from a network device, configuration information indicating a correspondence between an identifier of services and at least one Radio Access Technology (RAT) that comprises a plurality of access layer parameters, the plurality of access layer parameters of the at least one RAT indicated in the configuration information from the network device comprising whether 64 quadrature amplitude modulation (64QAM) is used for modulation;

determining a RAT corresponding to a first service based on the correspondence and the access layer parameter that whether 64 quadrature amplitude modulation (64QAM) is used for modulation, when the first service corresponds to at least two RATs; and transmitting the first service by using the determined RAT.

16. The non-transitory computer-readable storage medium of claim 15 wherein the identifier of the services is a Provider Service Identifier (PSID) or an Intelligent Transportation System Application Identifier (ITS-AID).

17. The non-transitory computer-readable storage medium of claim 16 wherein:

the configuration information is further configured to indicate a correspondence between a Prose Per-Packet Priority (PPPP) of the services and the at least one RAT.

* * * * *